United States Patent [19]

Jung et al.

[11] Patent Number: 4,462,038
[45] Date of Patent: Jul. 24, 1984

[54] MULTICOLOR RECORDING CARRIER AND METHOD OF RECORDING

[75] Inventors: Werner Jung, Waiblingen; Hans-Georg Mall, Stuttgart, both of Fed. Rep. of Germany

[73] Assignee: Robert Bosch GmbH, Stuttgart, Fed. Rep. of Germany

[21] Appl. No.: 222,999

[22] Filed: Jan. 6, 1981

[51] Int. Cl.$^3$ ............................................. G01D 15/08
[52] U.S. Cl. .................................... 346/163; 346/135.1
[58] Field of Search ........................ 346/157, 162–164, 346/135.1; 358/297–300; 355/4

[56] References Cited

U.S. PATENT DOCUMENTS

| 2,961,287 | 11/1960 | Zabriskie et al. ............... 346/163 X |
| 3,434,878 | 3/1969 | Reis . |
| 3,679,818 | 7/1972 | Courtney-Pratt . |
| 3,789,425 | 1/1974 | Matsushima . |
| 3,995,083 | 11/1976 | Reichle . |
| 4,007,489 | 2/1977 | Helmberger et al. ............... 346/157 |
| 4,307,165 | 12/1981 | Blazey et al. ........................ 355/4 X |

FOREIGN PATENT DOCUMENTS

| 1020261 | 11/1957 | Fed. Rep. of Germany . |
| 1054323 | 4/1959 | Fed. Rep. of Germany . |
| 2241925 | 4/1974 | Fed. Rep. of Germany . |
| 2503016 | 7/1976 | Fed. Rep. of Germany . |
| 2197345 | 3/1974 | France . |
| 2406525 | 5/1979 | France . |
| 1593574 | 4/1951 | United Kingdom . |

OTHER PUBLICATIONS

IBM Technical Disclosure Bulletin, vol. 24, No. 2, Jul. 1981 "Multi–Color Recording Medium" by D. J. Hall et al.–p. 1259.

Primary Examiner—Thomas H. Tarcza
Attorney, Agent, or Firm—Frishauf, Holtz, Goodman & Woodward

[57] ABSTRACT

To permit color reproduction of signals representing a color image by burning off a metalized layer (2) on an insulating substrate (1, 3), by contacting the metalized layer with an electrode (35) and passing a current pulse through the electrode, the color pattern is placed beneath the metalized layer and comprises groups (17) of colored dots which are essentially hexagonal in shape and positioned closely adjacent each other to form a color dot pattern of beehive appearance. One of the color dot pattern preferably additionally has a characteristic other than color to distinguish it from the others and provide a locating marker; the additional characteristic may, for example, be magnetic particles on the dots to be sensed by an electromagnetic transducer, similar to a tape recorder head, or a difference in reflectivity which can be sensed by an optical transducer.

18 Claims, 8 Drawing Figures

MULTICOLOR RECORDING CARRIER AND METHOD OF RECORDING

Thermographic recording paper, and apparatus, to which the present invention relates is described and claimed in U.S. Pat. Nos. :
 3,831,179, Brill et al;
 3,936,545, Brill et al;
 4,143,582, Brill et al; and
 U.S. Ser. 034,258, Brill et al, filed Apr. 30, 1979, now U.S. Pat. No. 4,241,356
all assigned to the assignee of the present application.

The present invention relates to thermographic recording carriers, a method of recording, and to apparatus in connection therewith.

BACKGROUND AND PRIOR ART

The referenced application Ser. No. 222,998 filed Jan. 6, 1981, KUDELSKI and SCHLUP, entitled "MULTICOLOR RECORDING CARRIER AND METHOD OF RECORDING", discloses a recording method, a recording medium, and apparatus to effect the recording of color or multicolor images under control of electrical recording signals representative of position and color of images to be recorded on an electrosensitive recording carrier. The recording carrier includes an insulating substrate, which may be transparent or opaque, and a metalized layer thereover which, under the influence of electrical current applied by an electrode, is burned off. In accordance with the invention of the referenced application, color or multicolor image recording is effected by burning off selected spots of the metalized layer, beneath which there are placed groups of color elements. Thus, the substrate has groups of color elements applied beneath the metalized surface, and when the writing or recording electrode is energized at a proper time, that is, when a specific electrode is over a specific color element, the metalized coating will be burned off, exposing the particular color element. If the substrate is transparent, the resulting image can be viewed by transmitted light; if the substrate is opaque, the resulting image can be viewed by incident light. The color elements can be applied, for example, by dying the substrate or by printing colored elements thereon. For a complete disclosure and discussion of the method, recording carrier and apparatus, reference is had to the above application, the disclosure of which is hereby incorporated by reference. The carrier, method, and apparatus for recording by burning off a metalized layer disclosed in this referenced application is an improvement over the previous black/white recording which is well known and described, for example, in the referenced issued patents. Developments is black/white recording were directed to improving the contrast between the burned-out area and the remaining metalized coating. The metalized coating, as such, due to the metalization, may have a shiny surface. Typical electrosensitive coatings are zinc, aluminum, or zinc-cadmium alloys, applied to the electrically insulating substrate by vapor deposition in a vacuum.

THE INVENTION

It is an object to improve the contrast and accuracy of recording of color or multicolor images.

Briefly, in accordance with the invention, the colored dots are so arranged that they contain the complementary colors of at least two base colors and, preferably, also dots which are entirely black. In accordance with a feature of the invention, the respective color dots are essentially hexagonal, fitting together in beehive pattern and against each other with essentially no space of uncolored or uninked substrate therebetween. The respective color dots are so dimensioned that their size is approximately that of the contact area of a recording electrode, for example about 0.15 mm between opposite sides.

The ink dots can be applied by multicolor offset printing, for example. Arranging the dots to be essentially hexagonal, fitting against each other in beehive pattern eliminates spaces between the dots and results in excellent color reproduction. The shape of these dots can be easily matched to the shape of the burn-out area which, in turn, essentially conforms to the cross-sectional shape of the recording electrode which effects removal of the metalized coating by burning it away.

The sizes of the dots can readily be so arranged that they are just slightly less than the average power of resolution of the human eye. At a normal observation distance of about 30 cm, the effective size of the dots, in an average cross-sectional dimension, should preferably be in the order of about 0.15 mm or less.

As set forth in the cross-referenced KUDELSKI and SCHLUP application, reference markers can be applied to the substrate to provide a reference from which the writing electrode can be positioned across lines of these dots. In accordance with a feature of the present invention, the markers can be used to synchronize the writing electrode and the recording head, and to trigger count pulses which can be compared with stored count data, or can be used to read out counters, and additionally can be used to control a positioning device which, at the initiation of each new line, adjusts the timing of burn-out pulses, or the position of the electrodes with respect to the groups of colored dot elements in adjacent lines. Preferably, colored dots of any one specific color are shifted or offset laterally with respect to the same color of an adjacent line. The reference color dots can be used to control the respective energization of the electrode or the position thereof in accordance with the respective position of a selected color.

In accordance with a preferred embodiment, the reference markers are reference points which are placed in the field in which the image is to be reproduced and is precisely aligned with respect to the multicolor pattern on the recording substrate. The largest possible distance of the reference point to the color dots of a particular color will then be equal to the number of the colors present multiplied by the diameter, or the effective width of the color dots as such. It is practically impossible to maintain the width of the recording carrier precisely accurately under all conditions, since the recording carrier may absorb moisture or be exposed to different ambient conditions so that its area changes. Any positioning errors due to such variations of the actual recording paper with respect to an ideal or standard, on which the imaged signals to be recorded must be based, can thus be compensated by readjusting the timing of burn-out pulses and/or the positioning of the electrode for respective lines in accordance with a calculated actual width of the substrate on which recording is to be effected in relation to the theoretical width on which the recording signals are based, and deriving an error signal from a comparison.

The reference points can be forced by specially treated color dot elements within the pattern itself, so that they can be unambiguously identified by the writing electrode or by a suitable transducer without, on the other hand, interfering with or falsifying the image content or the color thereof. In one embodiment, which is preferred, all elements of one color are formed as reference points. In accordance with a feature of the invention, the reference point can be characterized in addition to its color content by adding a magnetic powder in addition to the color pigment. Alternatively, the reference point can be characterized by giving it a different degree of reflectivity, for example by making it shinier than the other color elements, so that the reference points can be optically sensed by optical transducing through the metalized coating or the substrates if transparent.

Figure 1:
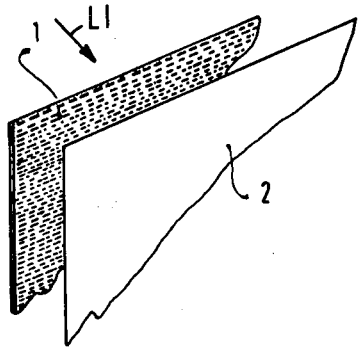
FIG. 1 is a perspective exploded view of a recording carrier for transmitted light viewing.

Embodiment of FIG. 1: A substrate 1 of insulating material, for example a plastic such as Mylar (Reg. TM for oriented polyester fiber), has a metal film 2 applied thereto, for example by vapor deposition in a vacuum, The substrate 1 is a light transmissive plastic which has a polychrome coloring applied thereto in accordance with the desired multicolor pattern, as will be explained in detail below. This recording carrier is particularly suitable for use in apparatus in which light is directed towards the carrier from the side remote from the viewer, that is, in the direction of the arrow L1.

Figure 2:
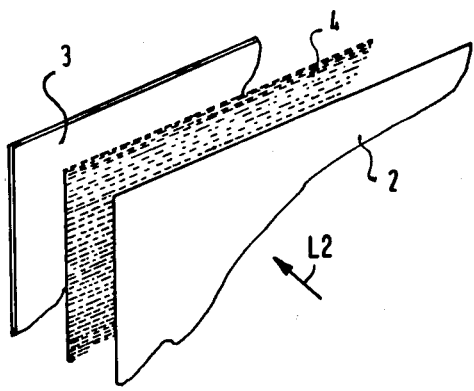
FIG. 2 is a perspective exploded view of a recording carrier for incident light viewing.

Embodiment of FIG. 2: A substrate 3, made of any desired electrical insulating material which, preferably, is opaque, such as paper, has a lacquer layer 4 applied thereto. The lacquer layer 4 is a color layer by or on which the multicolor pattern is applied, for example by printing. The lacquer layer 4, that is, the printed color layer, is covered at the top side by a metal film 2, similar to the metal film 2 of FIG. 1, and therefore has been given the same reference numeral. This recording carrier is suitable for direct viewing when placed in an illuminated area as indicated by the arrow L2 which, at the same time, represents incident light and also shows the direction of viewing.

Figure 3:
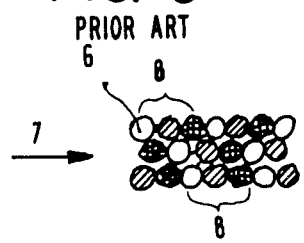
FIG. 3 is a greatly enlarged top view of color dot groupings of the recording carrier as explained in the cross-referenced application by KUDELSKI and SCHLUP.

The multicolor pattern applied on the substrates of either FIG. 1 or 2 can have the configuration shown in FIG. 3. The multicolor pattern in accordance with FIG. 3 has essentially circular color dot elements 6, for example having the colors yellow, green and red. For representation on the drawing, the yellow elements have been left blank and circled; the green elements have been supplied with section marks, and the red elements with cross hatching. The color elements 6 are arranged in periodically repetitive groups in the direction of reading of the lines, indicated by the arrow 7.

The result is groups 8 of color elements, formed by the elementary dots 6, in which the elements of the same color always have the same relative position with respect to an adjacent color element. The groups 8 of a row are preferably offset with respect to the groups 8 of an adjacent row, so that a spatial distribution of similarly colored elements will be formed in the color pattern. The size of the element 6 is so selected that any one possible burn-out position in the metal film 2 has an elementary group 8 associated therewith.

Figure 4:
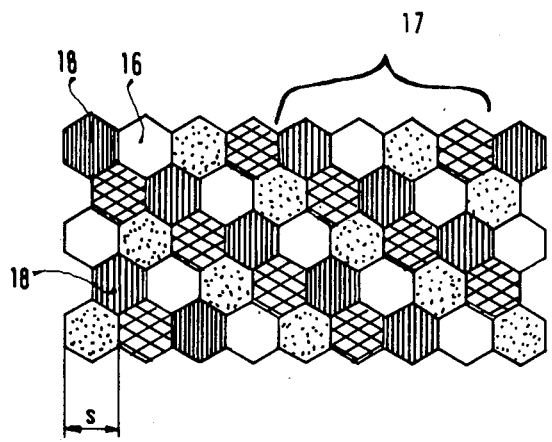
FIG. 4 is a still greater enlarged view of the recording carrier in accordance with the present invention.

In accordance with a feature of the present invention, the multicolor dot pattern of FIG. 4 has beehive pattern, that is, hexagonal color dot elements 16 arranged adjacent each other, without gaps, so that the entire recording field is covered with colored dots. The colored dots 16, alternatingly, have the colors black, yellow, blue and red, in which the colors are schematically represented as follows: black: vertically hatched; yellow: blank; blue: stippled; red: cross-hatched. The color elements 16 are associated in groups 17, which repeat periodically. The color dot groups 17 are offset laterally in adjacent lines, that is, are staggered with respect to each other, so that the elements or dots of any one color are uniformly distributed over the entire recording field. The horizontal distance s of any one color element 16 is, preferably, less than the resolving power of the average human observer at about 30 cm, and selected to be preferably not greater than about 0.15 mm. Consequently, the color pattern can no longer be resolved by the human eye at the average reading distance of 30 cm.

The black color elements of the multicolor pattern, shown by the vertical lines and indicated at 18, can be formed with an additional indicating indicium in addition to the normal pigmentation. A magnetic powder is added to the black pigment which, in advance of writing on the recording carrier, can be magnetized, for example by passing it over a permanent magnet. The elementary dots 16, in addition to providing information due to their color, separately and independently, or as an additive to other colors, further form reference markers for an inductive signal transducer which is coupled to the recording head in order to insure exact positioning of the recording head electrode with respect to the multicolor dot groups and which can, additionally, be used to time the triggering of recorded pulses applied to the recording electrode. Placing the reference points directly within the field of recording, also permits numerical association of a recording electrode with a specific color dot in any one of the lines. The largest possible distance with a similar black colored dot which does not have magnetic pigment added thereto will be four times the width of the dots, that is, 4·s, that is, about 0.6 mm. At this small distance, a positioning error due to stretching of the substrate of 1% would be a distance of 6 μm —which is a tolerable error over the width of the usual type and format of recording carrier, for example of the approximately 21—½×28 cm size.

Reference signals can be transduced not only in the form of magnetic signals; optical sensing of reference markers can also be provided. For example, the reference markers 18 may be formed to have a different degree of reflectivity than the color dots of the color dot pattern in such a manner that, after metalizing, that is, after application of the metal coating 2 (FIGS. 1, 2), the higher reflectivity of the reference dots can still be sensed by an optical transducer, for example of the incident or reflected light type. Light-sensitive transducers of extremely small size are readily available, in the form of light-sensitive semiconductors, which may be coupled to the recording medium by a light guide which, as known, can be extremely small. Both reference systems can be used used conjointly, for example magnetic reference points can be used to determine the position of a specific line in the x axis direction; the optical reference marker can be used for positioning in the y axis.

Figure 5:
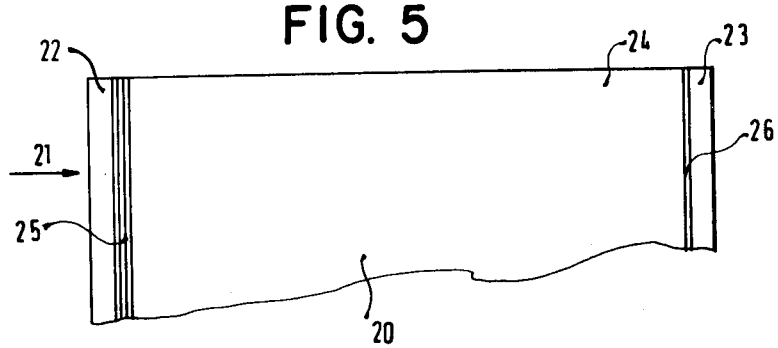
FIG. 5 is a top view of a recording carrier with longitudinal side markers from which representations of the color dot groupings have been omitted for clarity.

FIG. 5 shows another arrangement, in which the reference markers are elongated lines 25, 26 applied to marginal portions 22, 23 on the carrier 20. In this embodiment, the reference lines are outside of the field 24 of the information content on the carrier 20, as explained in the aforementioned KUDELSKI and SCHLUP application. The distance between the marking lines 25 corresponds to the distance which the elements of one color in a line of the multicolor group have from each other. The marker lines 26 can be used, for example, to determine the deviation of the width of the recording carrier from a standard width, for example due to the absorption of moisture.

In accordance with a feature of the present invention, the marker lines 25, 26 can also be applied in addition to the reference points or dots 18, and located within the imaging field 24 of the substrate carrier 20. The reference markers can be applied either to the top side or to the bottom side of the recording carrier, that is, either at the side of the substrate 1, 3, respectively, carrying the metalization coating 2 or at the reverse side.

Figure 6:
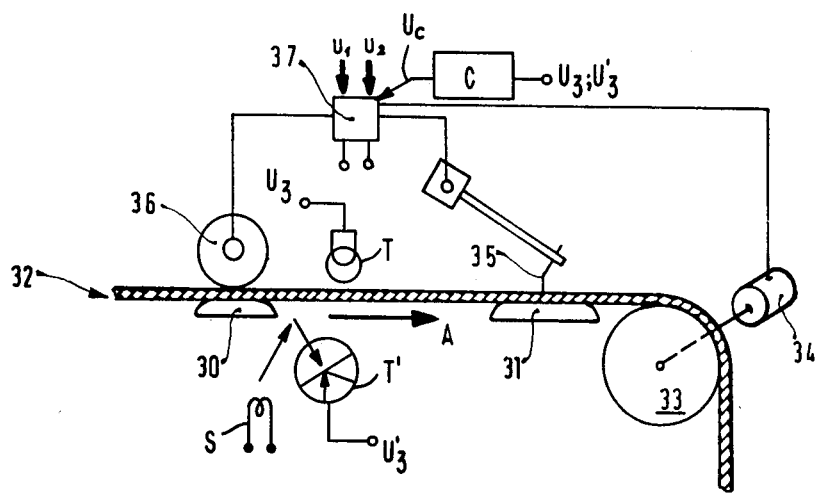
FIG. 6 is a highly schematic view of an arrangement to record multicolor images in accordance with the method.

The apparatus to carry out the process in accordance with the present invention and to record on the recording carrier thereof is shown in FIG. 6. Two fixed supports 30, 31 are provided over which the flexible recording carrier 2, corresponding to either one of the embodiments of FIG. 1 or 2, is transported by a transport device 33, 34, shown only schematically. The recording carrier 32 is pulled in the direction of the arrow A. The electro-sensitive coating of the carrier 32 is engaged in the region of the support 31 by a recording electrode 35. It is further engaged in the region of the support 30 by a wide-area counter electrode 36 formed, for example, as a conductive roller riding on the paper and in engagement therewith. The electrodes 35, 36 are connected to a pulse source 37 which is controlled in accordance with writing signals $U_1$ and phase or color or chroma signals $U_2$. The pulse generator 37 also provides control signals to the transport device 33 to longitudinally move the recording carrier 32 in the direction of the arrow A.

The writting signals $U_1$ provide signals to energize the respective electrode 35 to provide a burn-out pulse at a selected instant of time. The phase or color signals $U_2$ are used to so position the respective writing electrode 35 when the appropriate burn-out pulse is received over the recording carrier 32 that the pulse which is generated will make visible the desired specific color element of the color element group 17 beneath the recording stylus.

The marker lines 25, 26 as well as the markers 18 can be read by suitable transducers. FIG. 6 shows, schematically, an inductive transducer T which can be similar to a tape recorder transducer, with a plurality of adjacently positioned gaps, aligned with the respective expected positions of alignment of dots 18 in succeeding lines. Transducer T' is shown schematically as an optical transducer, in which a light source S projects a beam on the recording carrier which is reflected in accordance with the reflectivity or degree of shininess of the respective dot or line on the carrier, to be picked up in form of an electrical signal by a photo-sensitive semiconductor T', and providing an output signal $U'_3$. the signal from transducer T is an output signal $U_3$. The output signals $U_3$, $U'_3$ are applied to a control unit C which provides an output $U_c$ to appropriately position the writing electrode or, if the electrode covers a multiplicity of color dots within a group 17, to properly phase the burn-out pulse $U_1$ to expose the selected color. The control unit may also include a counter and, if for example, a plurality of marker dots 18 are applied across a line of the colored dots, the counting time of the counter receiving signals $U_3$ then being compared with a standard counting time to derive an error signal so that the burn-out pulses will be properly associated with the respectively desired dots even if the substrate should have changed size beyond an expected amount. The two transducer systems T, T' can be used separately, or together.

Separation of markers at both sides of the substrate carrier is suitable particularly when the substrate carrier is transparent (embodiment of FIG. 1).

The colors selected for the color groups preferably are red, blue and yellow or green, respectively, and black, in which the black dot can also serve as a carrier for magnetic pigment or with differential reflectivity. Preferably, the multicolored groups contain complementary colors in which at least two base colors of the complementary groups are contained. The reference points 18 can occur at selected marginal points of the carrier at marginal points of the groups of colored dots, or can be placed with all groups of the colored dots, for repetitive occurrence.

Various changes and modifications may be made, and features described in connection with any one of the embodiments may be used with any of the others, within the scope of the inventive concept.

We claim:

1. A combination of a recording image carrier comprising an insulating substrate (1, 3);
    a multicolor pattern of color dots having individual colors in which each dot is of a single color, closely adjacent each other to form a color dot pattern, located in groups (17) on the substrate;
    a metallized layer (2) above said groups of color dots; and
    magnetic dots applied to said insulating substrate in predetermined location with respect to a dot of a predetermined color of said color dots (16); with
    color recording apparatus comprising
    a recording stylus electrode (35) in engagement with the metallized layer (2) of the recording carrier;
    means (37) to provide energization pulses to said electrode to burn off a selected portion of the metallized layer above a selected color dot, or selected color dots;
    electromagnetic transducing means positioned for electromagnetic sensing of magnetic induction upon passage of the magnetic marker element on the recording carrier beneath the transducing means;
    and control means (c) controlling application of a burn-off signal to the electrode (35) in accordance with the position of the electrode on the recording carrier with reference to said magnetic dot as sensed by said electromagnetic transducing means.

2. Combination according to claim 1 wherein at least some of the color dots additionally include magnetic pigment to form, simultaneously, and in the same location, a color dot and said magnetic dot.

3. Combination according to claim 1 wherein said color dots are printed on said substrate by offset printing.

4. Combination according to claim 1, wherein said color dots, in plan outline, are essentially polygonal and located on said subtrate in an essentially beehive configuration.

5. Combination according to claim 1, wherein said color dots, in plan outline, are essentially hexagonal and located on said substrate in an essentially beehive configuration.

6. Combination according to claim 1, wherein in combination with the recording electrode the multicolor dots include the color black, and complementary colors of at least one group of complementary colors.

7. Combination according to claim 1, wherein the multi-color dots include the color black, red, blue, and at least one of the colors yellow, green.

8. Combination according to claim 1, wherein the groups of the color dots comprise complementary colors of at least one group of complementary colors.

9. Combination according to claim 1, wherein the color dots have a side-to-side distance of not more than about 0.15 mm.

10. Multicolor recording image carrier for electrosensitive recording,
having
an insulating substrate (1, 3) and a metallized layer (32) thereon, adapted to be engaged by a writing or recording electrode (35) which, when electrically energized, burns off a selected portion of the metallized layer to expose the underlying substrate to form an image of the information content to be recorded by contrast between the metallized layer and the underlying substrate, said multicolor image comprising
a multicolor pattern of color dots (16) of various, individual colors, in which each dot is of a single color, located in groups (17) beneath the metallized layer,
said color dots providing, upon selective burning-off of the metallized layer thereover, a color or multicolor image representation; and
reference marker dots (18) forming reference points positioned on the substrate and located in predetermined location with respect to at least one selected color dot,
wherein the reference marker dosts comprise a magnetic pigment to permit electromagnetic transducing of the position of said reference marker dots on the substrate, and hence of said precisely aligned selected color dot.

11. Image carrier according to claim 10, wherein said color dots, in plan outline, are essentially polygonal and located on said substrate in an essentially beehive configuration.

12. Image carrier according to claim 10, wherein said color dots, in plan outline, are essentially hexagonal and located on said substrate in an essentially beehive configuration.

13. Image carrier according to claim 10, wherein the multi-color dots include the color black, and complementary colors of at least one group of complementary colors.

14. Image carrier according to claim 10, wherein the multi-color dots include the color black, red, blue, and at least one of the colors yellow, green.

15. Image carrier according to claim 10, wherein the groups of the color dots comprise complementary colors of at least one group of complementary colors.

16. Image carrier according to claim 10, wherein the color dots have a side-to-side distance of not more than about 0.15 mm.

17. Image carrier according to claim 10, wherein at least some of the color dots additionally include magnetic pigment to form, simultaneously, and in the same location, a color dot and said magnetic dot.

18. Image carrier according to claim 10, wherein said color dots are printed on said substrate by offset printing.

* * * * *